UNITED STATES PATENT OFFICE.

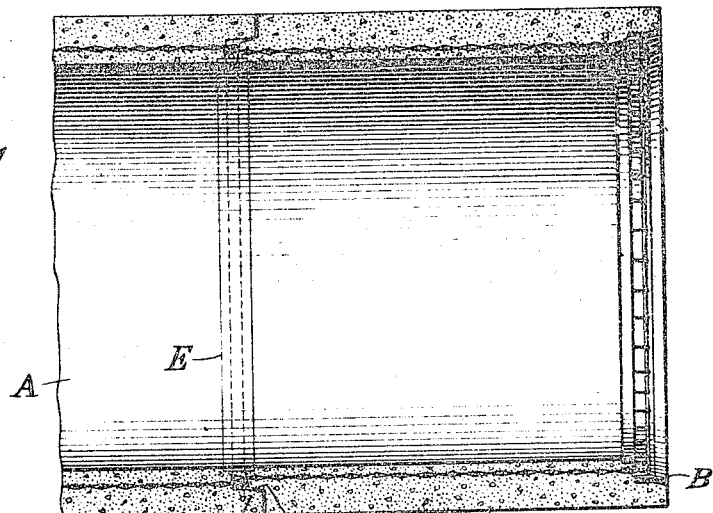
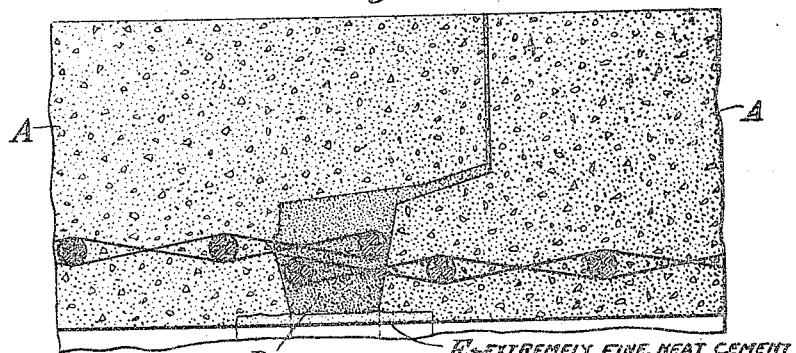
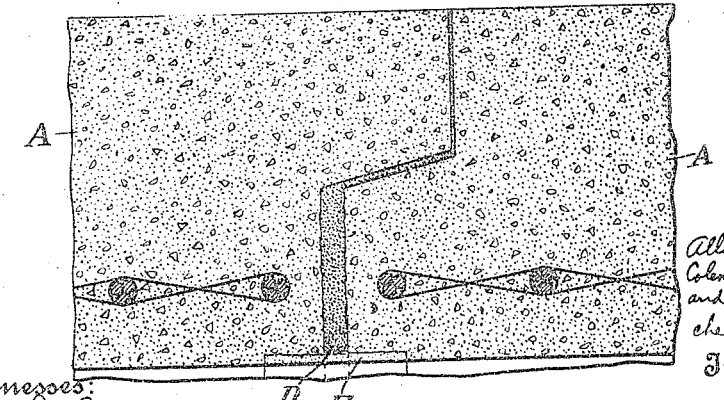

ALLAN M. HIRSH AND COLEMAN MERIWETHER, OF MONTCLAIR, AND JOHN C. MITCHELL, OF EAST ORANGE, NEW JERSEY, ASSIGNORS TO LOCK JOINT PIPE COMPANY, OF NEW YORK, N. Y., A CORPORATION OF NEW JERSEY.

WATER-TIGHT JOINT FOR CONCRETE WATER-PIPES.

1,143,117. Specification of Letters Patent. Patented June 15, 1915.

Application filed January 26, 1914. Serial No. 814,340. REISSUED

*To all whom it may concern:*

Be it known that we, ALLAN M. HIRSH and COLEMAN MERIWETHER, residing at Montclair, and JOHN C. MITCHELL, residing at East Orange, all in the county of Essex and State of New Jersey, have invented certain new and useful Improvements in Water-Tight Joints for Concrete Water-Pipes, of which the following is a full, clear, and exact description, reference being had to the accompanying drawings, forming a part of the same.

We have heretofore manufactured concrete pipes of the form shown and described in the patent to Coleman Meriwether, No. 894,517, dated July 28, 1908. In this pipe there are employed sections of concrete formed with a bell at one end and a spigot at the other, the bell being slightly longer than the spigot, so that when the pipe sections are brought into abutting contact an annular groove or recess will be formed along the joint on the interior of the pipe.

In order that this pipe may have greater strength, there is incorporated with each section a metallic reinforcement, generally composed of expanded metal or wire netting which projects beyond the ends of the said sections so as to overlap within the groove, and the pipe, after the sections are united, is completed by a filling of cement, cement mortar, or concrete, applied by suitable means in the grooves.

For all general purposes, such as sewer pipes, drains, or the like, joints formed in the manner above described are fully adequate to meet all of the conditions encountered in practical use, and experience has demonstrated that such joints are fully capable of withstanding, without leakage, an internal pressure of five or six pounds to the square inch.

We have found, however, that when the pipes are designed to withstand a substantially higher pressure, such as is ordinarily encountered in pressure mains or water pipes, that the ordinary joint is not sufficient, for shrinkage cracks develop at the joints, which, while perhaps not visible to the naked eye, will nevertheless permit the leakage of a large quantity of water. After many attempts to solve this problem, and to produce a substantially water-tight joint for pressure pipes of this character, we have devised a form of joint which is not only very economical, but highly efficient and durable. The principle of the construction is capable of wide application, but for convenience, the invention will be described as applied to the special form of pipe disclosed in the Meriwether patent above referred to.

According to the present invention, there is formed, usually by the configuration of the molds, a slight depression in the body of the concrete on each side of the annular groove between the ends of the spigot and the base of the bell, and this depression, after the main portion of the groove has been filled with ordinary cement, cement mortar, or concrete, and allowed to set, is filled with a very fine neat cement, or by an equivalent cementitious material, by means of a trowel or similar implement. It is not necessary for the perfection of the joint that this secondary seal of cement should be applied in a recess or groove, but, by the provision of such a groove the interior surface of the pipe is made smooth and uniform, and for this reason the recess has peculiar advantages. It has been found that this secondary filling of cement constitutes, in itself, a true secondary seal, and that when used in addition to the filler, it renders the joint, for all practical purposes, substantially water-tight, even under high pressures.

The primary filling for the main groove may be composed of the ordinary cement, cement mortar, or finely divided concrete, but the secondary, or superposed filling, should be extremely fine. Such filling may be most conveniently produced by passing the ordinary commercial cement through a sieve, the meshes of which will permit the passage of no particles larger than the one two hundredths of an inch, or any other material possessing like properties may be used. When the joint is thus produced it will be found that the adhesion of the commercial cement filler to the pipe sections is much less perfect than is that of the secondary seal, and that the latter serves as a luting with properties akin to elasticity and takes hold of the surfaces of the pipe sections with a firm and tenacious grip. Such a joint is substantially water-tight, extremely durable and efficient, and costs but a trifle more than the ordinary joint made with a single filler.

In the accompanying drawings, illustrating the invention, Figure 1 is a longitudinal section of a pipe, Fig. 2 is an enlarged section of the joint, and Fig. 3 is a similar section of a modified form of joint.

In the particular pipe illustrated, the sections A are molded in any desired form, with a bell B at one end and a spigot C at the other, the bell in this case being somewhat longer than the spigot, so that an annular groove will be formed by the assemblage of the two sections, around the interior of the pipe. After two such sections have been brought into abutting contact, and this groove filled with a body D of ordinary cement, or cement mortar, the latter is allowed to set and a body of very finely sifted cement E is then applied over the primary filler. This may be done in a comparatively few minutes, or after the lapse of a long time, provided it is a distinctly separate operation. In practice, it is usual to finish a given section of pipe and then, if the diameter of the pipe permits it, to go over the line and apply the secondary seal.

As pointed out above, to facilitate the application of the latter and to provide for a smooth interior finish, a shallow recess or groove is formed by providing in the ends of the pipe sections notches or recesses on each side of the main groove, as is shown in the drawings.

The form and dimensions of the main groove are largely immaterial, and in the annexed drawing two forms of such groove are illustrated, that of Fig. 3 being much narrower than in the other figures.

In most cases, the reinforcements of metal, when such are used, at all, overlap each other in the groove, and are united by the primary filling of cement, or cement mortar, but this is a matter which is determined by the character of work required and the reinforcements need not overlap the joint unless it be so desired. Joints made in this way are very durable and efficient. The secondary seal is extremely adherent both to the primary or main filler, when applied directly thereto, and to the parts of the concrete sections with which it comes into contact, and while by the main filler alone it is extremely difficult to obtain a joint which will not leak under high internal pressures, by the application of the secondary seal a one hundred per cent. tight joint for any ordinary pressure is readily secured.

Without limitation as to any special form of pipe and joint, what we claim is:

1. A water tight joint for concrete water pipes and the like, formed by the combination of two abutting concrete sections having an interior groove or recess at the line of union, a primary filler of cement, or cement mortar, for the groove, and a secondary seal of fine cementitious material.

2. A water tight joint for concrete water pipes and the like, formed by the combination of two abutting concrete sections having an interior groove or recess at the line of union, a primary filler of cement, or cement mortar for the groove, and a secondary seal of finely sifted cement applied over the same.

3. A water tight joint for concrete water pipes and the like, formed by the combination of two abutting sections of pipe having an interior main and secondary recess or groove at the line of union, a primary filler of cement or cement mortar for the main groove, and a secondary filler of finely divided neat cement for the other.

4. A water tight joint for concrete water pipes and the like, formed by the combination of two abutting pipe sections having a bell and spigot union, the bell being longer than the spigot to form an interior annular groove at the line of union, a filler of cement, or cement mortar for such groove, and a secondary seal of finely sifted neat cement applied over the same.

5. A water tight joint for concrete water pipes and the like, formed by the combination of two abutting pipe sections having a bell and spigot union, the bell being longer than the spigot to form an interior annular groove at the line of union, and the ends of the pipe sections being shaped to form a recess over the groove, a primary filler of cement, or cement mortar for the main groove, and a secondary seal or filler of finely sifted neat cement for the recess over the same.

In witness whereof we affix our signatures in the presence of two subscribing witnesses.

ALLAN M. HIRSH.
COLEMAN MERIWETHER.
JOHN C. MITCHELL.

Witnesses:
M. LAWSON DYER,
THOMAS J. BYRNE.